(12) United States Patent
Danel (10) Patent No.: US 7,922,477 B2
(45) Date of Patent: Apr. 12, 2011

(54) ROTATING MACHINE WITH A FLUID SUPPLY ROTATING COLUMN

(75) Inventor: Laurent Danel, Octeville sur Mer (FR)

(73) Assignee: Sidel Participations, Octeville sur Mer (FR)

( * ) Notice: Subject to any disclaimer, the term of this patent is extended or adjusted under 35 U.S.C. 154(b) by 689 days.

(21) Appl. No.: 11/915,346

(22) PCT Filed: May 23, 2006

(86) PCT No.: PCT/FR2006/001183
§ 371 (c)(1),
(2), (4) Date: Jan. 28, 2008

(87) PCT Pub. No.: WO2006/125912
PCT Pub. Date: Nov. 30, 2006

(65) Prior Publication Data
US 2008/0199555 A1  Aug. 21, 2008

(30) Foreign Application Priority Data
May 24, 2005 (FR) ...................................... 05 05201

(51) Int. Cl.
*B29C 49/36* (2006.01)
*B29C 49/42* (2006.01)
*B29C 49/58* (2006.01)
(52) U.S. Cl. ........................................ 425/535; 425/540
(58) Field of Classification Search .................. 425/522, 425/535, 540, 541
See application file for complete search history.

(56) References Cited

U.S. PATENT DOCUMENTS

| 3,415,915 A | 12/1968 | Lecluyse et al. |
| 3,891,371 A * | 6/1975 | Sokolow ................... 425/535 |
| 7,699,599 B2 * | 4/2010 | Danel et al. ................ 425/529 |
| 2007/0284789 A1 * | 12/2007 | Danel et al. ................ 264/532 |

FOREIGN PATENT DOCUMENTS

| FR | 1492016 A | 8/1967 |
| GB | 399350 A | 10/1933 |

* cited by examiner

*Primary Examiner* — Robert B Davis
(74) *Attorney, Agent, or Firm* — Sughrue Mion, PLLC (57) ABSTRACT

The invention concerns a rotating machine such as a carrousel comprising a rotating frame driven in rotation about an axis of rotation, several working stations supported by the rotating frame, a fluid supplying rotating column, coaxial to the axis of rotation of the rotating frame. The invention is characterized in that it comprises a column element (50, 250) provided with two assemblies (52, 252, 53) mobile in rotation relative to each other, about said axis of rotation, a first assembly (52, 252) including an axial tubular body (80, 280) provided with at least two tiers of radial through holes (81-86, 281-286), the axial conduits of the first assembly (52, 252) extending over different lengths in the space delimited by said tubular body (80, 280), each conduit (65a, 70-73, 75) emerging perpendicularly to one specific tier of radial through holes (81-86, 281-286), the column element (50, 250) thereby defining a rotating connection dispensing at least two fluids towards the working stations of the machine, and in that a sleeve C is interposed between said tubular body (80, 280) of the second assembly (53) and said first assembly (52, 252).

11 Claims, 8 Drawing Sheets

ROTATING MACHINE WITH A FLUID SUPPLY ROTATING COLUMN

TECHNICAL FILED

The present invention relates to improvements to carousel-type rotating machines comprising:
a rotating frame revolving about an axis of rotation;
several workstations supported by the rotating frame;
a rotating fluid-supply column coaxial with the axis of rotation of the rotating frame; and
at least one rotating fluid connector located on said column and connected to a fixed source of fluid.

The invention is more particularly concerned with rotating machines for making containers from thermoplastic materials, such as PET, by blow molding or stretch blow molding a preform (or intermediate container) in molds supported by a rotating bed.

The invention can be applied to rotating machines of other types such as filling machines.

BACKGROUND OF THE INVENTION

Figure 1:
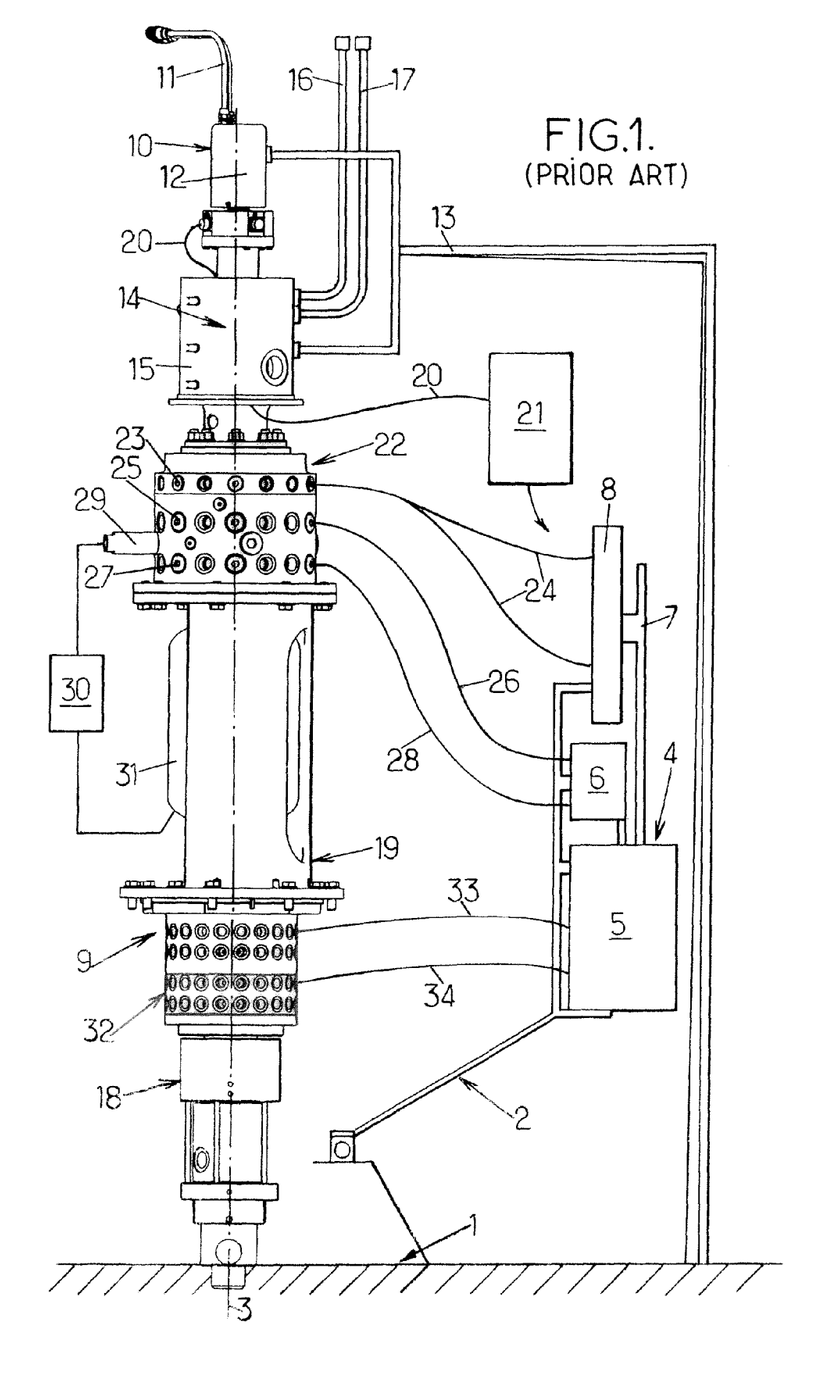
FIG. 1 is a highly simplified schematic view of a rotating machine with a rotating electrical power and fluid supply column of the prior art, shown in relative detail.

FIG. 1 of the appended drawings shows a side view of a rotating electrical power and fluid supply column currently installed in certain blow molding or stretch blow molding container manufacturing machines built by the applicant and representing the closest prior art.

The main parts of such a machine are simply sketched in a highly schematic form in FIG. 1.

The rotating machine shown in FIG. 1, of the carousel type, comprises a fixed bed 1 carrying a rotating frame 2 which revolves around an axis 3 of rotation.

The rotational drive means are not shown in FIG. 1.

The rotating frame 2 supports a number of workstations 4 set out at regular intervals around its periphery.

In the example considered, which is more specifically a stretch blow molding machine for producing containers such as bottles in a thermoplastic material such as PET, each workstation 4 comprises among other things:
a mold 5;
means 6 for controlling the preblowing fluid and the blowing fluid, and
a rod 7 for mechanically stretching the container as it is blown.

The preblowing fluid is at a medium pressure of approximately $13 \times 10^5$ pascals.

The blowing fluid is at a relatively high pressure, typically $40 \times 10^5$ pascals.

The rod 7 for mechanically stretching the container as it is blown is moved axially by actuating means 8 of e.g. cylinder type.

These rod 7 actuating means 8 are supplied at a relatively low pressure, typically $7 \times 10^5$ pascals.

The machine also comprises a rotating electrical power and fluid supply column 9 that extends coaxially with the axis 3 of rotation of the rotating frame 2.

This rotating column 9 supplies the electrical power and delivers the various necessary fluids for the operation of the workstations 4, from fixed respective sources.

For this purpose, the rotating column 9 comprises an electrical commutator 10 at the head of the rotating column 9.

This electrical commutator 10 is supplied by a fixed electrical cable 11.

The rotating electrical commutator 10 possesses fixed or rotating tracks on which rotating or fixed pins, respectively, press elastically, the whole being protected under a casing 12.

This fixed casing 12 is kept stationary by an anti-torque structure 13 indicated schematically in the form of a bracket mounted on the fixed bed 1.

The rotating fluid connector 14 is positioned axially underneath the rotating electrical commutator 10. Only the casing 15 of this rotating fluid connector 14 is visible in FIG. 1.

This fixed casing 15 is kept in position by the anti-torque structure 13.

The rotating fluid connector 14 is connected by a conduit 16 to a source of pneumatic fluid at relatively high-pressure, typically air at $40 \times 10^5$ pascals.

The rotating fluid connector 14 is connected by a conduit 17 to a source of pneumatic fluid at relatively low pressure, typically air at an industrial pressure of $7 \times 10^5$ pascals.

The conduits 16, 17 are fixed and supported for example by the anti-torque structure 13.

The base 18 of the rotating supply column 9, through which it rests on the fixed bed 1, is also itself fixed. Another alternative structure may be envisioned, mainly that the fixed base 18 may be connected not to the fixed bed 1 but to the anti-torque structure 13.

The rotating part of the rotating column 9 can also be referred to as the rotor 19.

The workstation supplies are provided as follows.

The output electrical cables 20 of the rotating electrical commutator 10 are connected to the rotor 19 of the rotating column 9.

So as not to become tangled with the anti-torque structure 13, these cables 20 are passed through the rotating fluid connector 14 via a functional connection to the rotor 19 and, at the end of the rotating fluid connector 14, are connected to an electrical power supply cabinet 21 mounted on the rotating frame 2.

This cabinet 21 contains the electrical supplies for the electrical components of the workstations 4, notably the solenoid valves.

The pneumatic fluid is fed out of the rotating connector 14 to a rotating fluid directional control valve 22.

This rotating fluid directional control valve 22 is situated underneath the rotating fluid connector 14 and comprises:
a first level 23 of connectors distributed around the perimeter for distributing low-pressure pneumatic fluid;
a second level 25 of connectors distributed around the perimeter for distributing high-pressure pneumatic blowing fluid;
a third level 27 of connectors distributed around the perimeter for distributing medium-pressure pneumatic preblowing fluid.

The first level 23 of connectors is connected at 24 to the actuating means 8 of the stretch rod 7.

The second level 25 of connectors is connected at 26 to the means 6 which control the aforementioned preblowing/blowing fluid.

The third level 27 of connectors is connected at 28 to the means 6 which control the aforementioned preblowing/blowing fluid.

The medium-pressure fluid, typically at $13 \times 10^5$ pascals is obtained by tapping off high-pressure fluid at 29 from the corresponding level of the rotating fluid directional control valve 22, the pressure of this high-pressure fluid being reduced in a pressure reducer 30 outside of the column 9 to lower it to the required pressure.

This reduced-pressure fluid is stored in a buffer tank 31, which may be integrated into a structure of the rotor 19 as shown in FIG. 1.

Below the buffer tank 31, the rotor 19 comprises a liquid directional control valve 32 for distributing at 33 and 34, to each workstation, the necessary water and/or oil, primarily for regulating the temperature of the molds 5.

In general terms, the rotating column 9 shown in FIG. 1 comprises, working down from the top:
- a rotating electrical commutator 10;
- a rotating fluid connector 14;
- a rotating fluid directional control valve 22;
- a medium-pressure pneumatic fluid buffer tank 31;
- a rotating directional control valve 32 for the water and oil; and
- a fixed base 18.

A rotating electrical power and fluid supply column 9 set out as described above is currently fitted to many machines built by the applicant and is perfectly satisfactory from the functional point of view.

However, there are a number of disadvantages inherent in the structure of this known column.

In the first place, because it has so many components placed on top of each other, namely a rotating electrical commutator 10, a rotating fluid connector 14, a rotating fluid directional control valve 22, a medium-pressure pneumatic fluid buffer tank 31, a rotating directional control valve 32 for the water and oil, and a fixed base 18, this column 9 is very tall.

To reduce the size and volume occupied by a carousel-type rotating machine, it would therefore be highly desirable to produce a rotating column with a reduced height.

In the second place, it is found in practice that the rotating electrical commutator 10, which is right at the top of the column, requires attention relatively rarely, whereas relatively regular attention is required to the rotating fluid connector 14 or to the rotating fluid directional control valve 22, both of which are located below the electrical commutator 10.

In particular, the sealing rings between the fixed and rotating parts of the rotating fluid connector 14 or those of the rotating fluid directional control valve 22 regular need replacing because of their relatively short service life, the result of the severe mechanical stresses to which they are exposed.

To replace worn sealing rings in the rotating fluid connector 14 or in the rotating fluid directional control valve 22, it is first necessary to remove the electrical commutator 10 before accessing the rotating fluid connector 14. This operation of removing the electrical commutator 10 is time consuming and can result in damage to the electrical commutator 10—even though the commutator 10 is not in need of maintenance. Furthermore, access to the fluid members is limited.

It would therefore be particularly helpful to the industry to produce a rotating column from which the electrical commutator 10 did not have to be removed when maintenance was required on the rotating fluid connector 14 or on the rotating fluid directional control valve 22.

SUMMARY OF THE INVENTION

There is therefore a pressing demand from users for improvements to be made to the rotating column by simplifying its maintenance, so that the machines would become more efficient and more productive.

It is therefore an object of the invention to provide a rotating supply column with an improved structure that more satisfactorily meets the diverse requirements of the industry, namely a rotating column of less height than in the prior art and on which certain maintenance operations can be carried out easily and quickly, especially the operation of replacing sealing rings between fixed part and moveable part.

To these ends, the invention provides a carousel-type rotating machine comprising:
- a rotating frame revolving about an axis of rotation;
- several workstations supported by the rotating frame; and
- a rotating fluid-supply column coaxial with the axis of rotation of the rotating frame;

said machine being characterized in that it comprises a column element provided with two assemblies which are rotationally moveable relative to each other about said axis of rotation, a first assembly comprising a bundle of at least two axial conduits, the second assembly comprising an axial tubular body provided with at least two levels of radial through holes, the axial conduits of the first assembly extending for different lengths in the space defined by said body, and each conduit having an open end level with a given level of through holes, the column element thus defining a rotating connector that dispenses at least two fluids to the workstations of the machine, and in that a jacket is interposed between said tubular body of the second assembly and the first assembly.

In accordance with various embodiments, the machine has the following features, optionally in combination:
- the jacket is fixed removably to the tubular body of the second assembly;
- the jacket consists of a number of cartridges;
- the first assembly comprises at least two concentric tubes, the innermost tube forming a first axial conduit which has an open end level with a first level of radial through orifices in the tubular body, said at least two tubes defining between them an annular space forming a second axial conduit that has an open end level with a second level of radial through orifices in the tubular body;
- the first assembly comprises a shaft and at least two parallel axial conduits each having an open end level with a level of radial through orifices in the tubular body;
- the first assembly is fixed and the second assembly revolves;
- the second assembly is positioned at the top of the column element;
- the first assembly comprises a first lower element extending beneath the tubular body and a second upper element extending in the space defined by the tubular body;
- the second element is provided with outer tiered bearing surfaces on which the jacket rests;
- the second element is provided with inner tiered bearing surfaces on which concentric tubes forming the axial conduits rest; and
- the first element is provided with tiered bearing surfaces on which said concentric tubes rest.

By means of these provisions, the minimum period of maintenance-free operation for a column built in accordance with the invention is about 7500 hours, which is about a year of operation. More precisely, the service life of the connector is typically four years. At a rate of 7500 hours per year and 33 revolutions per minute, this service life represents some 60 million revolutions.

Also the actual maintenance, as for example when replacing sealing rings in the rotating column, between the fixed part and the movable part, is of short duration, typically two hours, and can be done in situ, inside the machine, without disconnecting the various leads.

Maintenance can also be done through the top of the connector with the axis of rotation vertical.

The result is highly ergonomic and easy to assemble and strip, and the parts of the connector are relatively light, compatible with manual work.

BRIEF DESCRIPTION OF THE DRAWINGS

Other objects and advantages of the invention will be made clear by a description of certain preferred embodiments presented purely as non-restrictive examples. The description refers to the appended drawings, in which.

DESCRIPTION OF THE PREFERRED
EMBODIMENT OF THE INVENTION

We refer initially to FIGS. 2-7.

Figure 2:
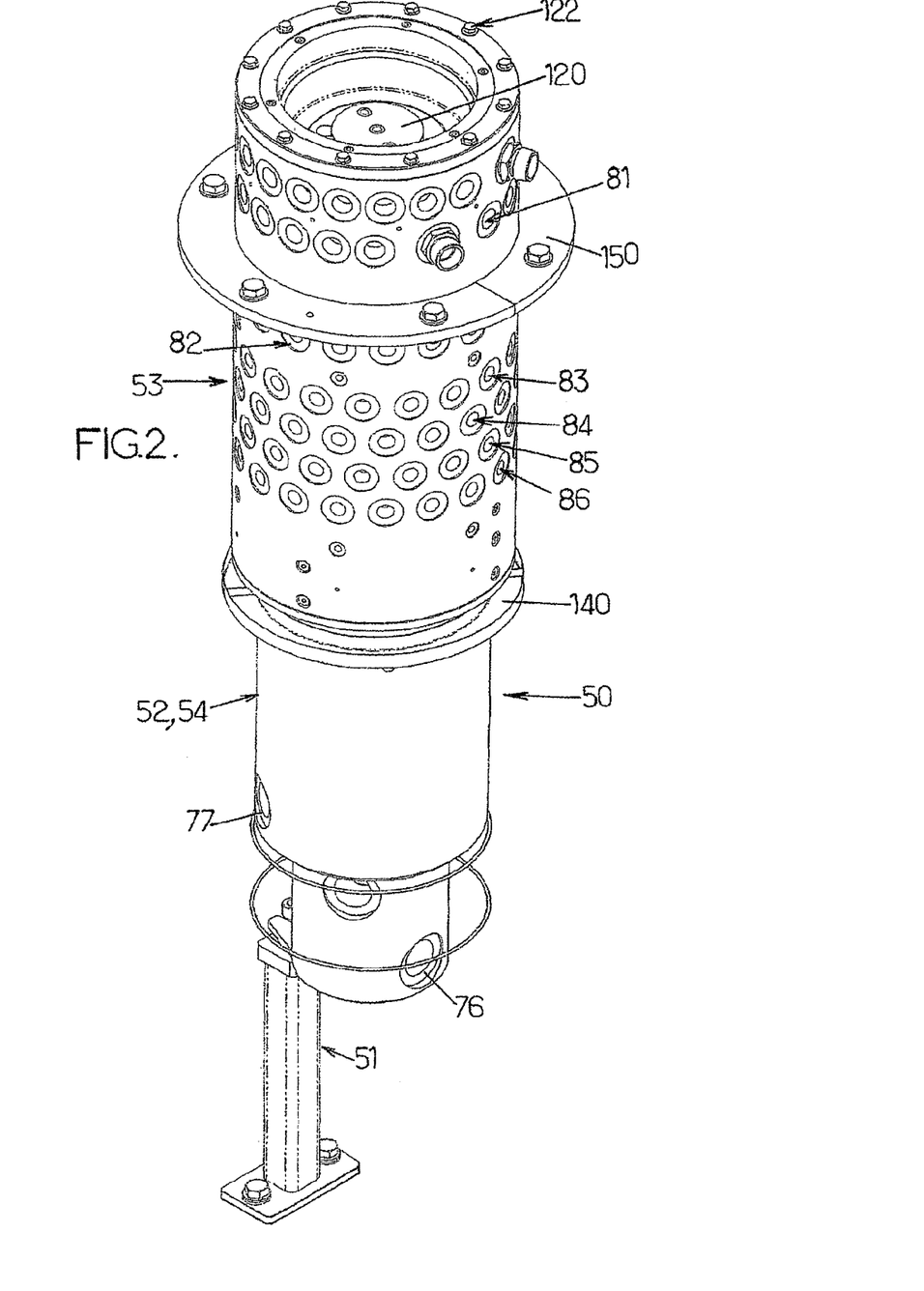
FIG. 2 is a perspective view of a column element according to the invention, in one embodiment.
Figure 3:
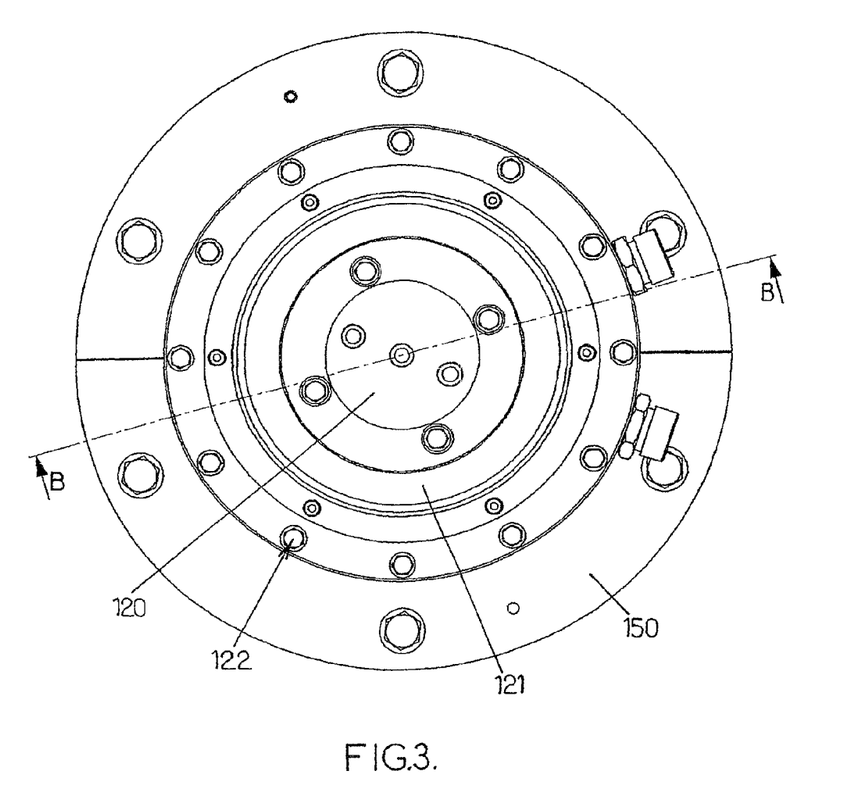
FIG. 3 is a top view of the element shown in FIG. 2.

The column element 50 illustrated is shown on a lower anti-torque mount 51.

This column element 50, when viewed externally, comprises two assemblies 52, 53 which are rotationally moveable relative to each other, the first 52 of these assemblies, here in the lower position, being fixed while the second 53, in the upper position, is moveable.

The first or fixed assembly 52 will be described first.

This first assembly 52 comprises a first or lower tubular element 54 of axis R, which has several tiered shoulders, typically ten tiered shoulders 55-64 (FIG. 6) in the example envisioned.

Figure 6:
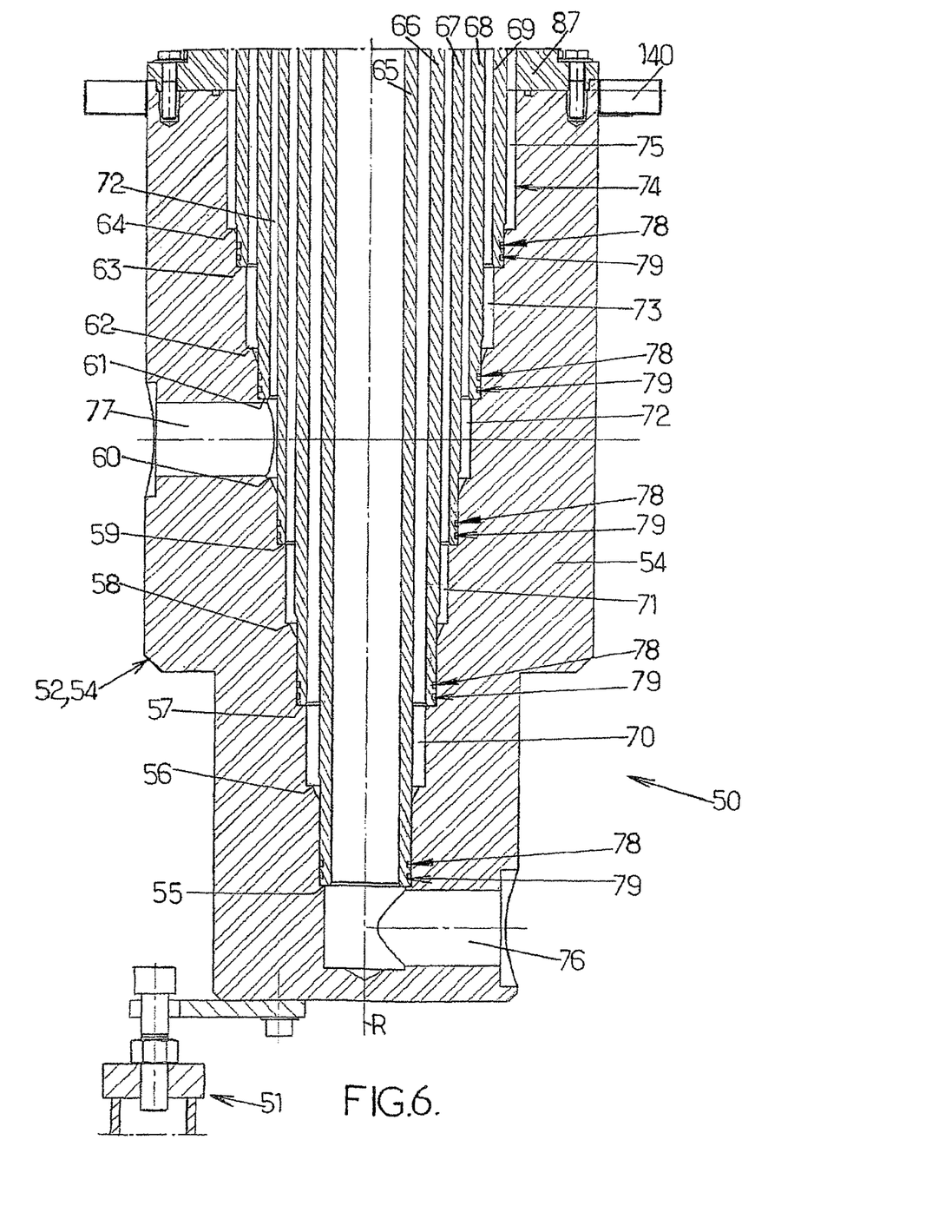
FIG. 6 is a longitudinal cross section through the bottom of the element shown in FIG. 2, the cutting planes of FIGS. 5 and 6 being the same.

The first or lower tubular element 54 of the first assembly 52 houses a corresponding number of concentric solid tubes, in this case five tubes 65-69. Arbitrarily, the innermost tube is called the first tube 65 and the outermost tube is called the fifth tube 69, the second 66, third 67 and fourth 68 tubes being the corresponding tubes situated concentrically and successively between the first tube 65 and the fifth tube 69.

Each of the five tubes 65-69 rests on one of said internal shoulders 55, 57, 59, 61, 63 of the first or lower tubular element 54, in such a way that there is only one unoccupied shoulder 56, 58, 60, 62, 64 between two immediately adjacent shoulders 55, 57, 59, 61, 63 supporting one of the tubes 65-69.

Consequently, because of the non-occupation of certain shoulders 56, 58, 60, 62, 64 by the tubes 65-69, each pair of immediately adjacent tubes 65-69 defines an annular axial space 70-73 or fluid passage. These passages do not communicate with each other.

The fifth tube 69, which is the outermost relative to the axis R, and the largest-diameter bore 74 of the first or lower tubular element 54 define an annular space 75 concentric with the annular spaces 70-73.

The annular spaces 70-73, 75 define five separate first fluid passages (or conduits), and the cylindrical internal volume of the first tube 65 (which is the innermost) defines a sixth annular axial space (or conduit) 65a for the passage of fluid.

Each of these six fluid passage spaces 65a, 70-73, 75, which are referred to indiscriminately as "passages" or "conduits" in this description, is connected to a radial inlet or outlet orifice to allow the fluid to travel upward or downward inside the column element 50.

These radial orifices are distributed around the perimeter of the first or lower tubular element 54, in such a way that only two of these orifices are visible in the figures, namely:

the lowest radial fluid inlet or outlet orifice 76 of the innermost tube 65, in which case fluid travels along the passage 65a;

the radial fluid inlet or outlet orifice 77 of the third annular fluid passage space 72 defined by the third tube 67 and fourth tube 68.

Other radial orifices not shown in the figures for reasons of clarity are also provided around the perimeter of the first or lower tubular element 54 of the first assembly 52. There is a radial orifice leading into each of the annular spaces 65a, 70-73, 75.

Each tube 65-69 is provided on its outer face with two annular grooves 78, 79 containing sealing rings.

The radial thicknesses of the tubes 65-69 are approximately equal.

These tubes 65-69 are advantageously provided with an anti-corrosion treatment or material, as is the first or lower tubular element 54 of the first assembly 52.

The sealing rings housed in the grooves 78, 79 are basically identical.

Only the axial length of the tubes 65-69 differentiates them clearly, the length decreasing from the first or innermost tube 65 to the fifth or outermost tube 69.

The arrangement described above allows economical manufacture of the tubes 65-69.

By the formation of ten (in the example considered) tiered internal shoulders 55-64, the first or lower tubular element 54 is given ten successive cylindrical bores of axis R whose diameters increase from the lowest to the highest in the first or lower tubular element 54, and the tubes 65-69 whose outside diameters are approximately equal to a bore diameter.

Thus, when the tubes 65-69 are fitted into the first or lower tubular element 54 of the first assembly 52, the sealing rings on each of the tubes rub for only a short distance against the mass of the first or lower tubular element 54 of the first assembly 52, this distance being no greater than the distance measured along the R axis between two adjacent annular shoulders 55-64.

As a guide, in an embodiment fitted to a machine built by the applicant, the height of the first or lower tubular element 54 of the first assembly 52 is approximately 550 mm, and the distance between adjacent shoulders varies between about 20 and 50 mm.

Figure 5:
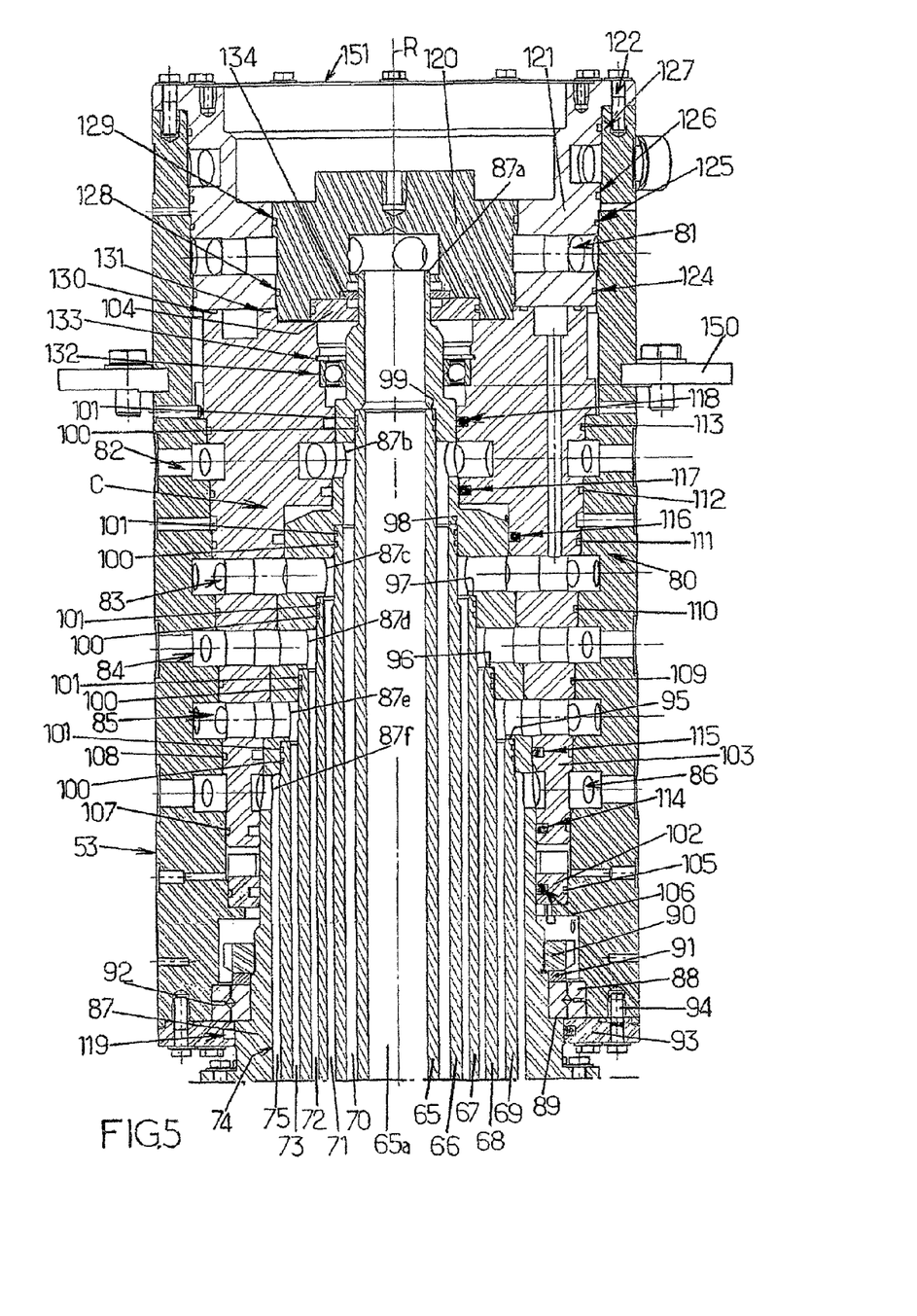
FIG. 5 is a longitudinal cross section through the top of the element shown in FIG. 2.

The second or moveable assembly 53, and the fixed elements housed in the space defined by this moveable assembly 53 will now be described (FIG. 5).

This moveable assembly 53 comprises a first or outer tubular element 80, also referred to as the tubular body 80, with radial orifices 81-86 set out in several levels.

Each level of radial orifices 81-86 corresponds to the outlet of one of the six fluid passages 65a, 70-73, 75 defined above.

The first or innermost tube 65 is level with a first or upper level of radial through orifices or holes 81 and the fluid traveling through the internal volume 65a of the first tube 65 flows through this first or uppermost level.

Then, working down through the second or moveable assembly 53, the following are found:

a second level of radial orifices 82 communicating with the first annular space 70 defined by the first and second tubes 65, 66;

a third level of radial orifices 83 communicating with the second annular space 71 defined by the second and third tubes 66, 67;

a fourth level of radial orifices 84 communicating with the third annular space 72 defined by the third and fourth tubes 67, 68;

a fifth level of radial orifices 85 communicating with the fourth annular space 73 defined by the fourth and fifth tubes 68, 69; and a sixth level of radial orifices 86 communicating with the fifth annular space 75 defined by the fifth tube 69 and a tubular shaft 87 mounted on the first or lower tubular element 54 of the first or fixed assembly 52.

The shaft 87 thus forms a second fixed element of the first assembly 52 of the column element 50.

In this way the shaft 87 forms with the tubes 65-69 and the first or lower tubular element 54 the first fixed assembly 52. In a preferred embodiment, the shaft 87, the tubes 65-69 and the first element 54 of the first assembly 52 are mutually detachable, though it is possible to make this first fixed assembly 52 as a monolithic component.

This shaft 87 extends axially through the volume defined by the first element 80 of the second or moveable assembly 53.

More precisely, the shaft 87 has an open tubular upper end 87*a* communicating with the first or upper level of radial through orifices 81.

A rolling-contact bearing 88 is fitted between the shaft 87 and the first element 80, or outer tubular body of the second or moveable assembly 53.

This bearing 88 may for example be a crossed roller bearing.

The inner ring of the bearing 88 rests on an annular shoulder 89 of the shaft 87. A slotted nut 90 is screwed against the shaft 87 and keeps the inner ring of the bearing 88 in position, a washer 91 being placed between the nut 90 and the inner ring of the bearing 88.

The slotted nut 90 may be made of for example type 304 L stainless steel. The washer 91 may for example be made of anodized series 5000 aluminum alloy.

The outer ring of the bearing 88 is housed in a groove 92 inside the first element 80 of the second assembly 53. This outer ring also rests on the lower cover 93 of this second assembly 53.

The lower cover 93 may be made of anodized series 5000 aluminum alloy, for example. It is screwed at 94 onto the first element 80 or axial tubular body of the second assembly 53.

The shaft 87 has five tiered shoulders 95-99 and on each of them the top end of a tube 65-69 rests.

On the outer perimeter of the shaft 87, beneath each shoulder 95-99, are radial through orifices 87*b*, 87*c*, 87*d*, 87*e*, 87*f* communicating with the second to sixth levels of radial through orifices 82-86 of the first or tubular element 80 and the first to fifth annular spaces 70-73, 75, while the sixth annular space 65*a* defined by the internal volume of the innermost tube 65 communicates with the upper level of radial through orifices 81.

The annular axial spaces 65*a*, 70-73, 75 defined by at least one axial tube 65-69 form with the radial through orifices 87*b*, 87*c*, 87*d*, 87*e*, 87*f* formed around the perimeter of the shaft 87 a plurality of axial fluid flow conduits not connected to each other: the end level with a given level of radial through holes 81-86 formed in the tubular body 80.

In this way, owing to the formation of several mutually unconnected fluid flow conduits, it forms a rotating connector for dispensing at least two fluids to the workstations of the machine.

On the outside of each tube 65-69 are two grooves 100-101 similar to the grooves 78-79. Each groove 100-101 houses a sealing ring.

A jacket C, advantageously of the removable type, is provided between the outer perimeter of the shaft 87 and the inner perimeter of the tubular body 80, the jacket C being fixed to the tubular body 80.

The jacket C advantageously has a plurality of radial through orifices connecting the radial orifices 87*b*, 87*c*, 87*d*, 87*e*, 87*f* of the shaft 87 to the second to sixth levels of radial orifices 82-86 of the tubular body 80.

In a preferred embodiment, the jacket C is made up of a plurality of cartridges 102-104 housed between the shaft 87 and the first element 80, or tubular body, of the second assembly 53, although it is also possible to make the jacket C as a monolithic component.

References to jacket C or cartridge 102-104 mean any element suitable for fixing to the tubular body 80, fitting onto the shaft 87 and providing a connection and contact interface between a fixed part and a moving part.

To form the sealed connection between the first or fixed assembly 52 and the second or moveable assembly 53, the cartridges 102-104 are provided, on their inner and outer perimeters, with O-rings or rubbing sealing rings housed in annular grooves.

Thus, the first or lower cartridge 102 is provided with:

an outer O-ring 105 in contact with the inner face of the first element 80, or tubular body 80, of the second assembly 53, and an internal rubbing sealing ring 106 on the outer face of the shaft 87.

The second or intermediate cartridge 103 is similarly provided with:

outer O-rings 107-113 against the inner face of the first element 80, or tubular body 80, of the second assembly 53, and rubbing sealing rings 114-118 on the outer face of the shaft 87.

The rubbing sealing rings 106, 114-118, each of the appropriate diameter, are made of for example filled PTFE, as is the rubbing ring 119 on the lower cover 93, pressing against the outer face of the shaft 87.

The third or upper cartridge 104 is housed in a recess on the underside of a central cap 120, this central cap 120 itself being mounted inside a second cap 121 screwed at 122 onto the top of the first element 80, or tubular body 80, of the second assembly 53.

Figure 4:
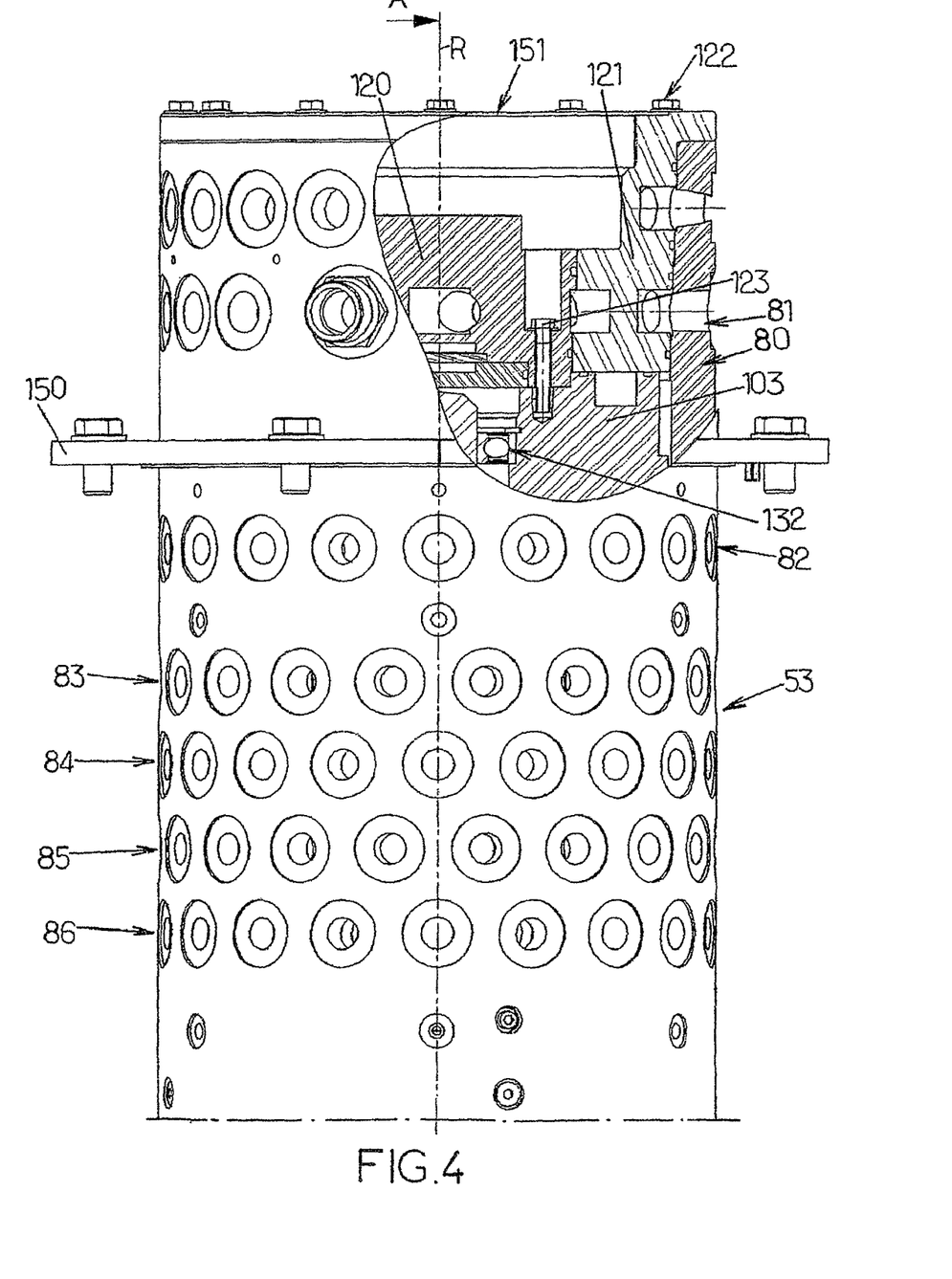
FIG. 4 is a front view, with part torn-away, of the top of the element shown in FIG. 2.

The central cap 120 is screwed at 123 onto the second cartridge 103 (FIG. 4).

O-rings 124-127 are placed in outer annular grooves on the second cap 121. These O-rings 124-127 press against the inner face of the first element 80, or tubular body 80, of the second or moveable assembly 53.

O-rings 128-129 are also inserted between the central cap 120 and the second cap 121, for example in grooves cut for this purpose in the central cap 120.

Similarly, O-rings 130, 131 are inserted between the top surface of the second cartridge 103 and the bottom surface of the second cap 121.

A rolling-contact bearing 132, optionally a ball bearing of a type known per se, is fitted between the shaft 87 and the second cartridge 103.

This rolling-contact bearing 132 is kept in position by, for example, a circlip 133 or spring ring.

Radial screws are one option for fixing the cartridges 102-104 to the first element 80, or tubular body 80, of the second assembly 53.

Figure 7:
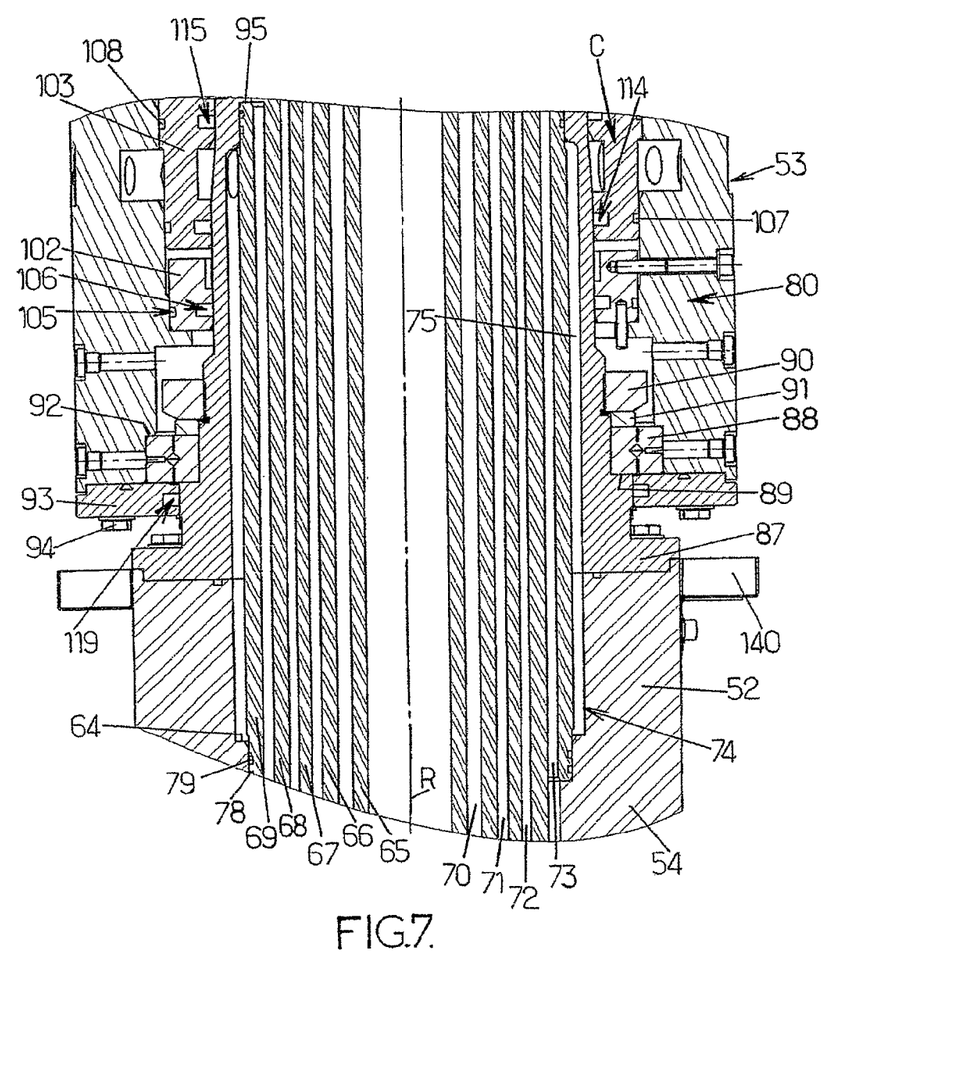
FIG. 7 is a detail view in longitudinal cross section through the element shown in FIG. 2, the cutting plane of FIG. 7 being the same as the cutting plane of FIGS. 5 and 6, with the top and bottom of the column element being shown in this FIG. 7.

An annular gutter 140 is attached to the first or fixed tubular element 54 of the first assembly 52 of the column element 50 to collect any water which may accidentally run down the outside wall of the first element (or tubular body) 80 (FIGS. 6 and 7).

The structure described above has very many advantages over previous structures.

The column element 50 is very compact, its height being for example approximately 1200 mm when fitted to a stretch blow molding machine of standard production capacity manufactured by the applicant.

The column element 50 has no less than six independent fluid passages, the supplies to these passages arriving radially, in the first element 54 of the first assembly 52 of the column element 50. The long conduits 16 and 17 shown in FIG. 1 are thus avoided and the height of the supply column is thus reduced.

The anti-torque component 51 is located at the bottom of the column element 50 and may for example be mounted between the fixed frame of a rotating machine and the first or fixed assembly 52 of the column element 50. The bracket corresponding to the anti-torque structure 13 in FIG. 1 is therefore not required. The volume occupied by the rotating column according to the invention is thus reduced.

The rotating part of the column element 50 may be fixed to the moving wheel of a rotating machine, for example by means of a flange 150. This connection can be made at a low height from the floor because the column element 50 is so compact.

When this column element 50 is integrated into a rotating container blow molding machine, the six fluid passages provide:
 a low-pressure (e.g. 7 bar) air line for controlling the actuators;
 a high-pressure (e.g. 40 bar) air line for preblowing and blowing;
 a supply line and a return line for the fluid used to cool the container bodies;
 a supply line and a return line for the fluid used to cool the necks and bottoms of containers.

The column element 50 thus forms a highly compact rotating air/water connector.

Advantageously, both for the first or fixed assembly 52 and for the second or moveable assembly 53 of the column element 50, all connection points are BSPP tapped to ISO standard 1179/DIN 3852 form E.

A supplementary circuit, for example for air at medium pressure, is advantageously obtained by reducing the pressure of a high-pressure line, this pressure reducing being effected in the core of the column element 50. The external pressure reducer 30, which can be seen in FIG. 1, can thus be dispensed with.

When the column element 50 is integrated into a rotating machine, maintenance can be carried out through the top of the column element 50 forming the air/water connector, the components of the column element 50 being relatively light in weight.

Thus, unscrewing the top transverse plate 151 and removing it gives access to the caps 120, 121.

The central cap 120 can then be unscrewed from the second cartridge 103 and removed, giving manual access to the third cartridge 104 and to a washer 134 acting as a spacer placed above the third cartridge 104 around the mouth 87a of the shaft 87.

Once the central cap 120, the third cartridge 104 and the spacer 134 are all out of the way, the cap 121 is screwed off and removed, giving access to the second cartridge 103.

In this way it is a quick and simple job to dismantle the rotating connector according to the invention and, for example, to replace the various sealing rings 105-118 on the inner and outer faces of the jacket C or of the cartridges 102-104.

Removing the second cartridge 103 also gives access to the shaft 87. The lower cover 93 and the first element 80 can be dismantled, thus giving access to the shaft 87.

The first element 80, or tubular body 80, of the second or moveable assembly 53 is provided with internal tiered shoulders so that the sealing rings 105, 107-113 on the outer perimeter of the cartridges 102-104 only rub for a short distance along the first element 80 when the cartridges 102-104 are being installed or removed.

This arrangement also limits the risk of damage to the sealing rings 105, 107-113, 124-127 when maintenance is being carried out.

Similarly, the shaft 87 is provided with external tiered shoulders, so that the rubbing sealing rings 106, 114-118 on the inner perimeter of each cartridge 102-104 do not rub over a large surface of the shaft 87 when the cartridges 102-104 are being installed or removed. T his arrangement means that the rubbing sealing rings 106, 114-118 are less likely to be damaged when maintenance is being carried out.

An example of an embodiment of the various fluid and operational lines of the common element 50 will now be described, in the context of a blow molding machine designed by the applicant.

As a guide, the moving part of the element rotates, in such machines, at a speed of around 33 revolutions per minute. An emergency stop takes about 0.8 s. The column element 50 is robustly constructed, the allowable leaks being very small, less than 0.01%. The number of blow molding stations may vary from machine to machine, for example 9, 12 or 18 stations.

40-Bar Air Line

High-pressure air is introduced into the column element 50 through the radial orifice 76 formed in the fixed tubular lower part 52 of this column element 50.

This high-pressure air is present in the line when there are containers to be blown in the molds 5.

This air enters the internal volume 65a of the innermost tube 65 of the column element 50, from here through radial orifices formed in the central cap 120, and then through a number of through radial orifices formed in the second cap 121, before exiting through the first level of radial through orifices 81 in the tubular body 80.

The flow rate of the air is a function of the number of stations and of the speed of the blow molding machine. As a guide, a flow rate of about 3500 m$^3$/h may be found necessary.

The maximum blowing pressure is typically around 40 bar in the applicant's current machines. This pressure will be that as it enters the radial orifice 76, communicating with the innermost central tube 65 of the column element 50.

7-Bar Air Line

The purpose of the low-pressure air (typically approximately 7 bar) is to supply the actuating means 8 such as the cylinders of the rods 7 described with reference to FIG. 1.

This air enters the lower field fixed of the column element 50, through a radial orifice formed in the lower tubular fixed part 52 of the column element 50.

This orifice leads into the first conduit or annular axial space 70 defined by the first and second concentric tubes 65, 66.

This air then passes out of the second tube 66, through a radial orifice 87b in the perimeter of the shaft 87, and out level with the second level of radial through orifices 82. After this, the air passes out through this radial orifice 87b, through transverse orifices formed in the second cartridge 103 before finally exiting from the tubular body 80 via the radial orifices formed in the second level of radial orifices 82.

The flow rate in this low-pressure air line will therefore be a function of the number of stations and of the speed of the machine. A guide figure of 600 m³/h for an operational flow rate may be found to be necessary.

Water Supply and Return Line for Cooling the Bodies of Containers

The flow rate will be a function of the number of stations and of the speed of the machine. The maximum necessary flow rate may be 11 m³ per hour, for example.

The maximum operating pressure will be 10 bar at the connector inlet. Normal operating pressure will be four bar at the connector inlet.

By the same principle as described above for the 40-bar and 7-bar air lines, the other conduits or annular spaces 71-73, 75 defining mutually non-communicating fluid passageways, are advantageously used for the supply and return movement of cooling fluid, e.g. water, for the thermal regulation of the containers. One pair of conduits will preferably be used to cool the body part of the containers and another pair of conduits will preferably be used to cool the neck and bottom parts of the containers. Radial through orifices are provided in the jacket C or in the lower and intermediate cartridges 102, 103 to connect the radial orifices 87b, 87c, 87d, 87e, 87f formed in the perimeter of the shaft 87 to the radial through orifices formed in the second to sixth levels of radial orifices 82-86 of the tubular body 80.

Figure 8:
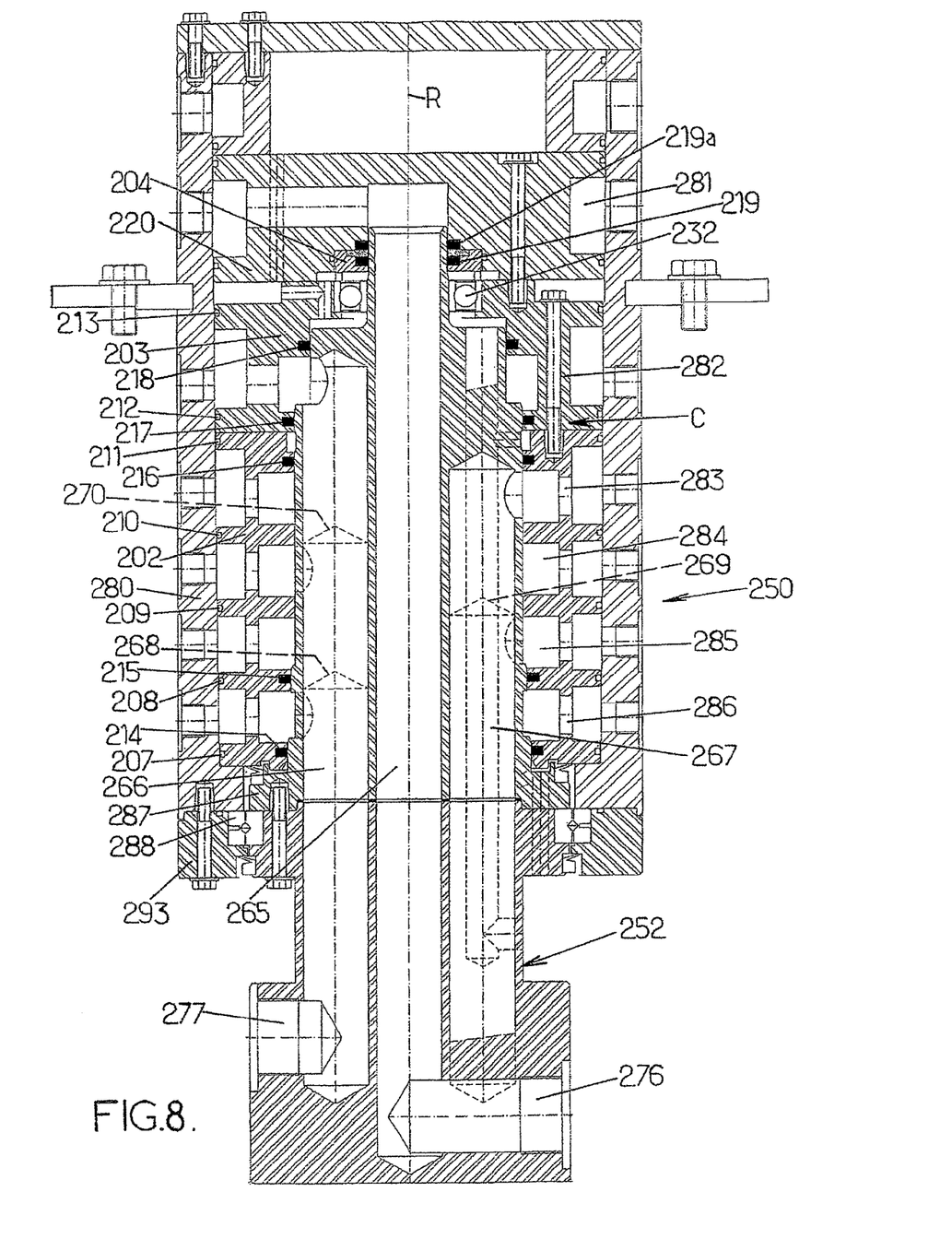
FIG. 8 is a cross section through a second embodiment of a column element for a rotating machine according to the invention.

Turning now to FIG. 8, this is a view in longitudinal section through a second embodiment of a column element forming a rotating connector according to the invention.

In this second embodiment, the column element 250 comprises a fixed first assembly 252 provided with six axial conduits 265-270 or parallel fluid passage holes, three of these passage holes 265-267 being shown in solid lines in this FIG. 8 while the other three 268-270 appear in dashes in this figure.

These parallel axial conduits 265-270 are of different lengths and each communicate:
   at the fixed lower part of the element 250, with a radial supply conduit 276-277 (only two radial supply conduits 276-277 are shown in FIG. 8 so as not to overload the figure);
   at the moveable upper part of the element 250, with radial holes 281-286 located in a given row and passing through a rotating tubular component or tubular body 280, a fixed shaft 287 and a jacket C.

Thus, in much the same way as was described with reference to FIGS. 2 to 7, the first or innermost axial conduit 265, or central axial conduit, communicates with a first row of holes 281, while the other conduits 266-270 each communicate with another row of radial holes 282-286.

The element 250 comprises, in much the same way as was described earlier:
   a rotating outer tubular body 280 provided with a screwed lower cap 293 and an upper cap;
   a fixed shaft 287 with orifices into each level of radial holes 281-286, this shaft 287 extending through the internal space defined by the tubular body 280;
   a rolling-contact bearing 288 housed between a fixed shaft 287 and the tubular body 280;
   rubbing sealing rings 214-219, 219a between the shaft 287 and the cartridges 202-204, namely a first or lower cartridge 202, a second or intermediate cartridge 203, and a third or upper cartridge 204, the third or upper cartridge 204 being mounted with rubbing sealing rings 219, 219a around the shaft 287 at the outlet of the central axial conduit 265;
   O-rings 207-213 between the lower cartridge 202 and intermediate cartridge 203 and the tubular body 280;
   a central cap 220 screwed onto the second or intermediate cartridge 203; and
   a rolling-contact bearing 232 between the shaft 287 and the second or intermediate cartridge 203.

As FIG. 8 shows, in this embodiment a rolling-contact bearing 288 is fitted in a groove formed by:
   a shoulder of the lower cover 293, on which shoulder the outer ring of the bearing 288 rests; and
   a shoulder formed in an annular projection of the first or fixed element 254, on which shoulder the inner ring of the bearing 288 rests.

Alternatively, in each of the embodiments described above, a rotating electrical commutator 10 such as that numbered in FIG. 1 may be mounted above the column element 50 or 250.

The invention thus provides a carousel-type rotating machine comprising:
   a rotating frame revolving about an axis of rotation;
   several workstations supported by the rotating frame; and
   a rotating fluid-supply column coaxial with the axis of rotation of the rotating frame;
said machine being characterized in that it comprises a column element 50, 250 provided with two assemblies 52, 252; 53 which are rotationally moveable relative to each other about said axis of rotation, a first assembly 52, 252 comprising a bundle of at least two axial conduits, the second assembly 53 comprising an axial tubular body 80, 280 provided with at least two levels of radial through holes 81-86, 281-286, the axial conduits of the first assembly 52, 252 extending for different lengths in the space defined by said tubular body 80, 280, and each conduit 65a, 70-73, 75 having an open end level with a given level of radial through holes 81-86, 281-286; the column element 50, 250 thus defining a rotating connector that dispenses at least two fluids to the workstations of the machine, and in that a jacket C is interposed between said tubular body 80, 280 of the second, preferably moveable, assembly 53 and said first, preferably fixed, assembly 52. The jacket C is preferably fixed removably to the tubular body 80, 280 of the second assembly 53.

In the first embodiment of the invention as illustrated in FIGS. 2-7, the first assembly 52 comprises a shaft 87 and at least two concentric tubes 65-69, the innermost tube 65 forming a first or axial conduit 65a which has an open end level with the first level of radial through orifices 81 in the tubular body 80, said at least two tubes 65-69 defining between them an axial annular space 70-73, 75 forming a second axial conduit that has an open end level with a second level of radial through orifices 82-86 in the tubular body 80.

Alternatively, in the second embodiment of the invention, as illustrated in FIG. 8, the first assembly 252 comprises at least two parallel axial conduits 265-269 each having an open end level with a level of radial through orifices 281-286 in the tubular body 280.

The second assembly 53 is preferably positioned at the top of the column element 50, 250.

The first assembly 52, 252 comprises a first or lower element 54 extending beneath the tubular body 80, 280 and a second or upper element 87, 287 extending in the space defined by the tubular body 80, 280.

Advantageously, the second element 87, 287 is provided with outer tiered bearing surfaces on which the jacket C rests as well as with internal tiered bearing surfaces on which concentric tubes 65-69 forming the axial spaces 65a, 70-73, 75 rest. The first element 54 is also provided with tiered shoulders 55-64 on which the concentric tubes 65-69 rest.

The invention claimed is:

1. A carousel type rotating machine comprising:
a rotating frame revolving about an axis of rotation;
several workstations supported by the rotating frame; and
a rotating fluid supply column coaxial with the axis of rotation of the rotating frame;
wherein said machine comprises a column element provided with two assemblies which are rotationally moveable relative to each other about said axis of rotation, a first assembly comprising a bundle of at least two axial conduits, the second assembly comprising an axial tubular body provided with at least two levels of radial through holes, the axial conduits of the first assembly extending for different lengths in the space defined by said tubular body, and each conduit having an open end level with a given level of radial through holes, the column element thus defining a rotating connector that dispenses at least two fluids to the workstations of the machine, and wherein a jacket is interposed between said tubular body of the second assembly and said first assembly.

2. The rotating machine as claimed in claim 1, wherein the jacket is fixed removably to the tubular body of the second assembly.

3. The rotating machine as claimed in claim 1, wherein the jacket consists of a number of cartridges.

4. The rotating machine as claimed in claim 1, wherein the first assembly comprises a shaft and at least two concentric tubes, the innermost tube forming a first axial conduit which has an open end level with a first level of radial through orifices in the tubular body, said at least two tubes defining between them an annular space forming a second axial conduit that has an open end level with a second level of radial through orifices in the tubular body.

5. The rotating machine as claimed in claim 1, wherein the first assembly comprises at least two parallel axial conduits each having an open end level with a level of radial through orifices in the tubular body.

6. The rotating machine as claimed in claim 1, wherein the first assembly is fixed and the second assembly revolves.

7. The rotating machine as claimed in claim 1, wherein the second assembly is positioned at the top of the column element.

8. The rotating machine as claimed in claim 1, wherein the first assembly comprises a first lower element extending beneath the tubular body and a second upper element extending in the space defined by the tubular body.

9. The rotating machine as claimed in claim 8, wherein the second element is provided with outer tiered bearing surfaces on which the jacket rests.

10. The rotating machine as claimed in claim 8, wherein the second element is provided with inner tiered shoulders on which concentric tubes forming the axial conduits rest.

11. The rotating machine as claimed in claim 8, wherein the first element is provided with tiered shoulders on which said concentric tubes rest.

\* \* \* \* \*